(12) United States Patent
Palkar

(10) Patent No.: US 7,783,038 B2
(45) Date of Patent: Aug. 24, 2010

(54) USING CODE AS KEYS FOR COPY PROTECTION

(75) Inventor: Malhar Palkar, Bangalore (IN)

(73) Assignee: LSI Corporation, Milpitas, CA (US)

( * ) Notice: Subject to any disclaimer, the term of this patent is extended or adjusted under 35 U.S.C. 154(b) by 1134 days.

(21) Appl. No.: 11/262,444

(22) Filed: Oct. 28, 2005

(65) Prior Publication Data

US 2007/0098157 A1     May 3, 2007

(51) Int. Cl.
*H04K 1/04*     (2006.01)
(52) U.S. Cl. .............................. 380/37; 380/28; 713/176
(58) Field of Classification Search .................... 380/28, 380/37; 713/176
See application file for complete search history.

(56) References Cited

U.S. PATENT DOCUMENTS 7,587,616 B2 *   9/2009   Jakubowski ................. 713/190
2005/0069131 A1 *   3/2005   de Jong ....................... 380/239

* cited by examiner

*Primary Examiner*—Kimyen Vu
*Assistant Examiner*—Baotran N To
(74) *Attorney, Agent, or Firm*—Christopher P. Maiorana, PC

(57) ABSTRACT

A method for obscuring data and software including the steps of (A) generating code for performing a predefined operation using one or more sets of predefined data, (B) generating a first binary representation of the code and (C) mixing the one or more sets of predefined data into the binary representation of the code such that the one or more sets of predefined data and the code are substantially indistinct from each other.

20 Claims, 6 Drawing Sheets

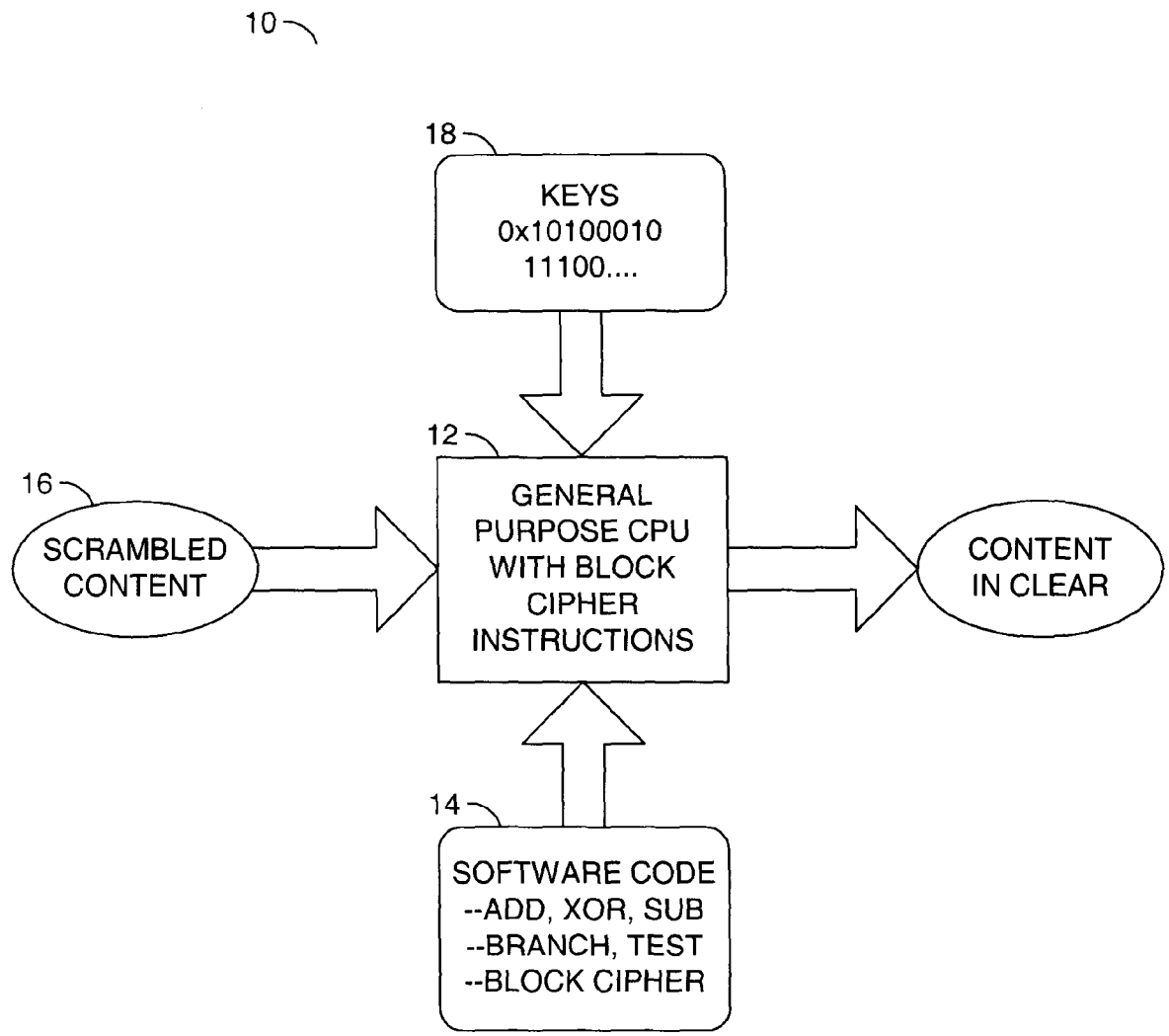
FIG. 1
(CONVENTIONAL)

```
200
 ├─ 202
 │   WRITE SW CODE FOR CRYPTOGRAPHIC
 │   OPERATION BASED ON PREDEFINED KEYS
 │
 ├─ 204
 │   COMPILE THE SW CODE TO GENERATE
 │   BINARY DATA. SPREAD KEYS INTO THIS
 │   DATA IN SUCH A WAY THAT KEYS ARE
 │   VALID SW OPCODES FOR THE CPU
 │
 ├─ 206
 │   MODIFY SW CODE THAT USES THE
 │   BINARY DATA TO IMPLEMENT
 │   CRYPTOGRAPHIC OPERATION
 │
 ├─ 208
 │   COMPILE THE SW CODE TO GENERATE
 │   BINARY DATA. IS OPERATION PROPER?
 │   NO → back to 206
 │   YES ↓
 │
 └─ 210
     FINAL COMPILATION OF THE CODE
```

FIG. 4

USING CODE AS KEYS FOR COPY PROTECTION

FIELD OF THE INVENTION

The present invention relates to data protection generally and, more particularly, to a method and/or apparatus using code as keys for copy protection.

BACKGROUND OF THE INVENTION

Copy protection is important technology for any digital transmission. There are several technology aspects for achieving copy protection (e.g., content scrambling, key exchange, key revocation, watermarking, etc.). Content scrambling is widely used in DVD playback to protect original content. Modern scrambling techniques employ large keys for scrambling. Modern scrambling techniques also have unique keys for each product. For security, the unique keys cannot be in the open (i.e., directly readable). Conventional techniques scramble the keys.

Referring to FIG. 1, a block diagram illustrating a conventional copy protection scheme 10 is shown. Because of the uniqueness and large length of the keys, scrambling is implemented in software. A general purpose processor (CPU) 12 with block cipher instructions executes a software process 14 which is configured to descramble scrambled content 16 using keys 18. The processor then presents the content in the clear (i.e., unscrambled).

However software cryptographic algorithms are vulnerable to hacking. In the conventional system, the software process 14 and the keys 18 are stored separately. Typically, hackers target the software implementation to reverse engineer the software process 14. Reverse engineering is done by single stepping or inserting break points into the code for the software process 14.

It would be desirable to have a method for preventing reverse engineering of software cryptographic processes.

SUMMARY OF THE INVENTION

The present invention concerns a method for obscuring data and software including the steps of (A) generating code for performing a predefined operation using one or more sets of predefined data, (B) generating a first binary representation of the code and (C) mixing the one or more sets of predefined data into the binary representation of the code such that the one or more sets of predefined data and the code are substantially indistinct from each other.

The objects, features and advantages of the present invention include providing a method and/or apparatus using code as keys for copy protection that may (i) mix code and keys (or other predefined data) together, (ii) change keys when code is changed, (iii) obscure the actual keys, (iv) use an iterative process to combine and/or separate the keys and the code and/or (v) make it difficult for hackers to obtain either the cryptographic process or the keys.

BRIEF DESCRIPTION OF THE DRAWINGS

These and other objects, features and advantages of the present invention will be apparent from the following detailed description and the appended claims and drawings in which:

FIG. 1 is a block diagram illustrating a conventional descrambling process;

FIG. 4 is a flow diagram illustrating a process in accordance with a preferred embodiment of the present invention for protecting keys;

DETAILED DESCRIPTION OF THE PREFERRED EMBODIMENTS

Figure 2:
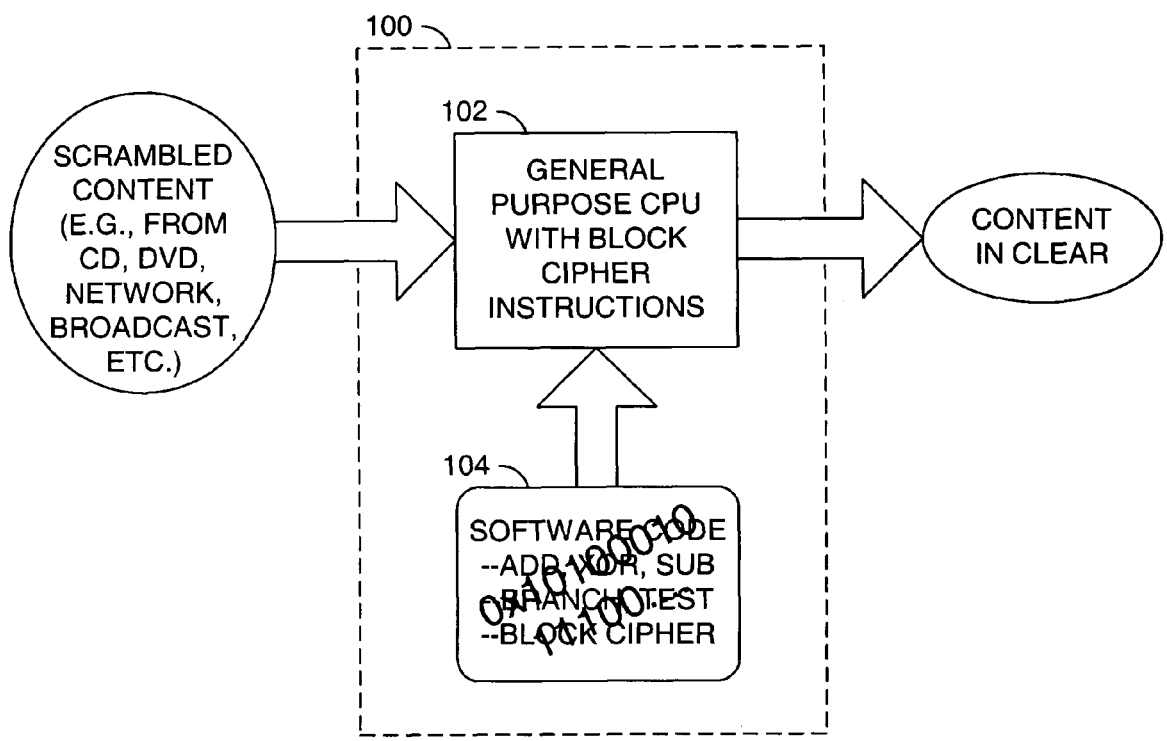
FIG. 2 is a block diagram illustrating a copy protection scheme in accordance with the present invention.

The present invention may improve robustness of content (or copy) protection by obfuscating keys (or other set of predefined data) and cryptographic (or other data) processes. The present invention may be used, in one example, to playback copy-protected content from any digital storage media (e.g., CD, DVD, blue-ray disc, memory cards, personal digital recorder, hard drive, etc.). The present invention may also be used in a broadcast (or transmission) environment (e.g., internet, IEEE 1394, HDMI, USB, etc.).

Copy protection generally refers to methods for preventing pirates from stealing content. Copy protection may also control how legitimate users may access particular content. Content scrambling generally refers to a technique in which the digital content is scrambled (or encrypted) and can be unscrambled (or decrypted) by authorized users. Unscrambling may be performed, for example, by using approved keys and descrambling methods (e.g., cryptographic operations). Key based scrambling is one of the techniques used for content protection. Another technique is watermarking. Watermarking generally refers to a tool that may be used as part of content protection. In watermarking, digital signatures may be embedded as part of the content.

Key based scrambling systems involve exchanging a key (or keys) between parties (or devices) that communicate copy protected data. Key exchange refers to a class of methods used to transfer keys to a legitimate device/user. The key exchange process generally involves authentication of the device and/or the user. In general, all encryption takes some kind of input key. For example, the key may be 56 bits, 128 bits, 256 bits, etc, depending on the complexity desired. In one example, the input key may be derived from two other keys (i) a device key and (ii) a disc (or content) key. The device key is generally embedded inside a particular device (e.g., DVD player, recorder, etc.). The disc key (or content key) is generally embedded on a disc or within the content. In general, the device performs an authentication process to be recognized as a valid device. When the device is recognized as valid the key is passed to the device.

The term cryptographic operation generally refers to a process (or method) that is used to descramble digital data and output the data in the clear (or unscrambled). In general, the cryptographic operation may be based on an encryption process. The encryption process may be complex and implemented by special instructions in a processor. In one example, a cryptographic operation may be based on a core block cipher method. The cipher block takes scrambled digital data and keys as inputs and produces unscrambled digital data (described in more detail in connection with FIG. 2 below).

In one example, the keys may be obtained from an independent licensing authority. The keys are generally kept secret by scrambling or encryption. However, the core of the encryption process may be well known and published in various conferences and papers. In the conventional approach, the scrambled (or encrypted) keys and the code for descrambling the keys are generally provided separately to a factory for incorporation into a chip. In a preferred embodiment of the present invention, the code and keys may be mixed and provided as a single unit to a factory for incorporation into a chip.

Referring to FIG. 2, a block diagram is shown illustrating a copy protection scheme in accordance with the present invention. A device 100 may be configured to present content in the clear by descrambling a scrambled input signal. The device 100 may include a processor (e.g., a general purpose processor (CPU), digital signal processor (DSP) or other programmable device) 102 and a storage medium 104. The processor 102 may be implemented, in one example, with block cipher instructions. The processor 102 may be configured to execute software (or firmware) instructions (or code) stored in the storage medium 104. In one example, the software instructions may be implemented (or configured, or designed) to cause the processor 102 to execute a predefined cryptographic operation.

The code stored in the storage medium 104 may comprise instructions for performing a cryptographic operation involving one or more keys. In one example, the keys may be mixed (or obscured) with the instructions for performing the cryptographic operation. In another example, the code may be used as the keys. When the code is used as the keys or the keys are mixed with the code, as described herein, changes in the code (e.g., inserting break points) would also change the keys. Since changing the code changes the keys, the present invention prevents the use of breakpoints (which modify the code) for determining the cryptographic technique and/or keys.

Other types of data and/or intellectual property (IP) may be protected (or obscured) using the present invention. For example, digital signal processing (DSP) processes (e.g., audio psycho acoustic models, etc.) and tables used to drive the DSP processes may be mixed (or combined) according to the teachings of the present invention. With respect to video, tables for quantification matrix selection may be obscured in the code for performing the quantification matrix selection. In general, the present invention may be applied to protect any process IP and the data IP used by the process IP (e.g., digital rights management, etc.).

The present invention may be implemented for a variety of applications. For example, the present invention may be applied in DVD, CD or any other optical playback or record application. The present invention may also be applied in network situations with digital rights management (DRM). For example, the scrambled input signal decrypted using the present invention may comprise keys that are exchanged and stored at a client. In one example, network applications may include, but are not limited to, ethernet, IEEE 1394, USB and/or any other appropriate transmission medium.

Figure 3:
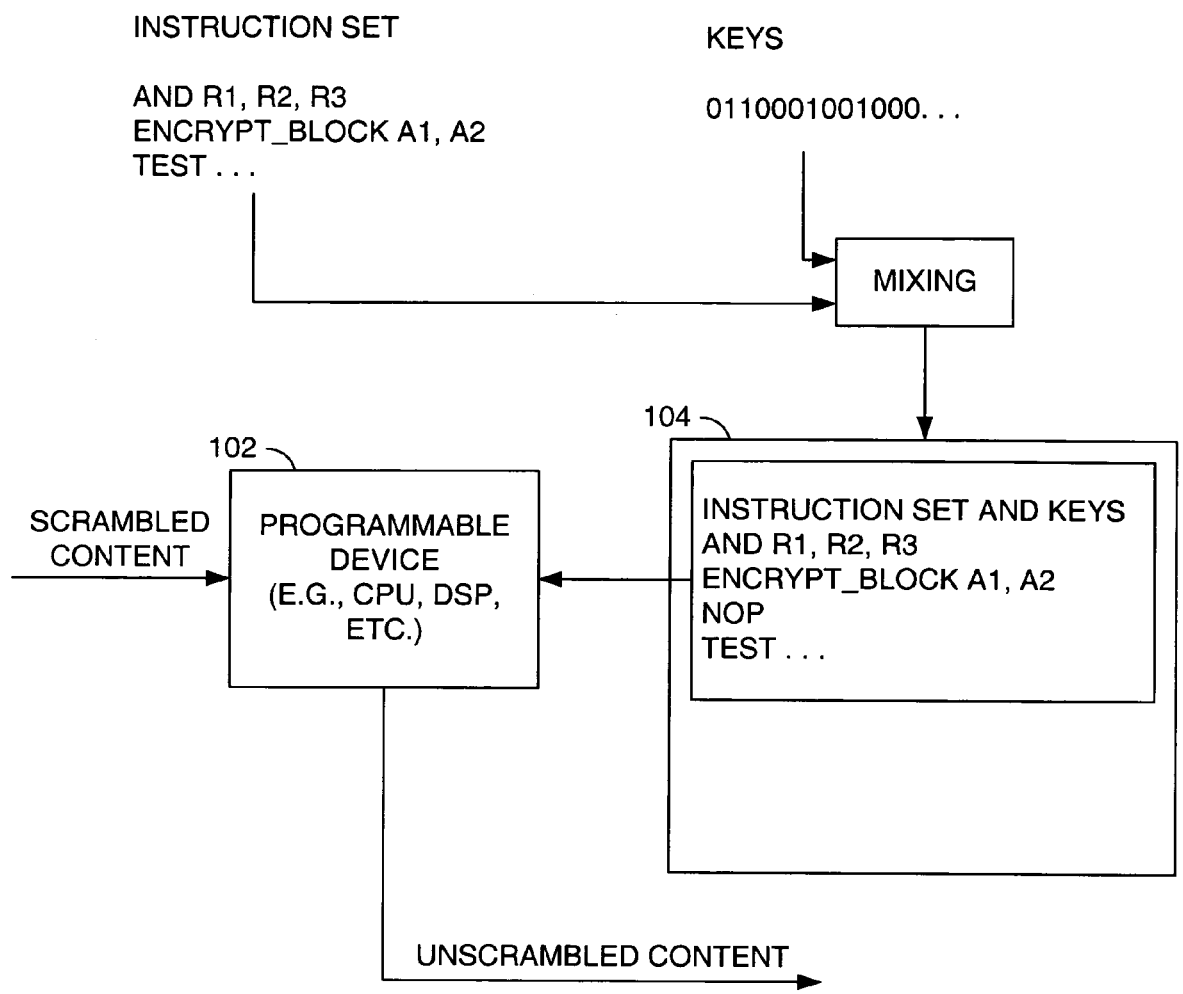
FIG. 3 is a block diagram illustrating a key scrambling technique in accordance with the present invention.

Referring to FIG. 3, a block diagram is shown illustrating an example of a process for mixing keys and software (SW) code in accordance with a preferred embodiment of the present invention. In one example, the mixing process may combine a sequence of instructions for performing the cryptographic operation and the keys used in the operation into a modified set (or sequence) of instructions. For example, an initial set of instructions may contain the following example opcodes:
   And r1, r2, r3
   Encrypt_block A1, A2
   Test.
Mixing the Keys:
   0110001001000 . . .
with the initial set of instructions may produce a final set of instructions illustrated by the following instructions:
   And r1, r2, r3
   Encrypt_block A1, A2
   NOP
   Test.

In one example, a mixing process in accordance with the present invention may comprise an iterative process that may add, for example, fake and/or useless instructions to the initial SW code. The final SW code may be stored (e.g., in the storage medium 104) and used (e.g., by the processor 102) to descramble the signal SCRAMBLED CONTENT in order to generate the signal UNSCRAMBLED CONTENT. In one example, the process for mixing the SW code and key(s) may be implemented with a recursive (or iterative) process as illustrated by the following examples.

In one example, the processor 102 may be implemented as a general purpose CPU. The processor 102 may be implemented, for example, with a number (e.g., sixteen) of registers (e.g., registers R0 to R15). The registers R0-R15 may be indexed (or addressed) from 0x0 to 0xF. In one example, the register R0 may always be zero. The processor 102 may include a predefined instruction set. In one example, the processor 102 may be implemented with instructions (or opcodes) similar to the following instructions:

NOP: An instruction that does nothing (e.g., No OPeration or Null OPeration).

LD X, A, Y: where X and Y are registers and A is an absolute address (e.g., 4 bits). The register X may contain a source address and the register Y may contain a destination address (or be a destination register). The instruction LD loads data from the source address to the destination address (or register).

XOR X, Y, Z: where X, Y and Z are registers. The instruction XOR may perform a logical exclusive-OR operation on the contents of the registers X and Y and store the result in the register Z (e.g., Z=X XOR Y).

ENCRYPT X, Y, Z: where X ,Y, Z are registers. The instruction ENCRYPT may encrypt a number (e.g., 64) of bytes following the address in X, by a key in Y (e.g., 16 bits). A result of the encryption is stored in Z register (or at a location pointed to be Z).

SET A, Y: where Y is register and A is an absolute number (e.g., an 8-bit value). The instruction SET will set a value of the number A into the register Y.

In one example, the NOP instruction may be implemented with a binary representation of 0x0. The LD instruction may be implemented with a binary representation of 0x1. The XOR instruction may be implemented with a binary representation of 0x2. The ENCRYPT instruction may be implemented with a binary representation of 0x3. The SET instruction may be implemented with a binary representation of 0x4. However, other opcodes (or machine codes) may be implemented accordingly to meet the design criteria of a particular implementation. Furthermore, although an example of a single instruction ENCRYPT is described (for clarity), encryption generally involves complex processes implemented with a number of instructions, as will be apparent to those skilled in the relevant art(s). The techniques described may be readily applied to sequences of instructions based on the teachings of the present disclosure, as will be apparent to those skilled in the relevant art(s).

In one example, the code may start at a memory location (or address) 0x00, the key may be located at a location 0x80 and the block on which the cryptographic operation is to be performed may be at a location 0xA0. In a first example, the key may have a value of 0x0123. In a first iteration, the code may be implemented as illustrated in the following TABLE 1:

TABLE 1

| Address | Code | Binary Representation | Comment |
|---|---|---|---|
| 0x0000 | SET 0x80, R1 | 0x4801 | set address of key (e.g., 0x80) into register R1. |
| 0x0002 | LD R1, 0, R2 | 0x1102 | load the key into register R2. |
| 0x0004 | SET 0xA0, R3 | 0x4A03 | set address of data (e.g., 0xA0) register into R3. |
| 0x0006 | ENCRYPT R3, R2, R4 | 0x3324 | Encrypt the block. |
| END CODE | | | |
| ... | | | |
| 0x0080 | | 0x0123 | Key |
| 0x00A0 | Data | | Block to Encrypt |

In a second iteration, the code and the key are mixed in accordance with a preferred embodiment of the present invention as illustrated in the following TABLE 2.

TABLE 2

| Address | Code | Binary Representation | Comment |
|---|---|---|---|
| 0x0000 | SET 0x02, R1 | 0x4021 | set address 0x02 into register R1. |
| 0x0002 | XXXX [NOP] | 0x0123 | Key. The key appears as a NOP operation. |
| 0x0004 | LD R1, 0, R2 | 0x1102 | load key into register R2. |
| 0x0006 | SET 0xA0, R3 | 0x4A03 | set address of 0xA0 into register R3. |
| 0x0008 | ENCRYPT R3, R2, R4 | 0x3324 | Encrypt the block pointed to be the register R3. |
| END CODE | | | |

When the code and key have been mixed, the operation of the combined code and key may be tested. In the above case, the code works after the second iteration and no further modification is performed. When the operation of the combined code and key(s) is correct, the code and key(s) mixture may be finally compiled.

In a second example, the key may have a value of 0x2321. In a first iteration, the code may be arranged as illustrated in the following TABLE 3:

TABLE 3

| Address | Code | Binary Representation | Comment |
|---|---|---|---|
| 0x0000 | SET 0x80, R1 | 0x4801 | set address 0x80 into the register R1. |

TABLE 3-continued

| Address | Code | Binary Representation | Comment |
|---|---|---|---|
| 0x0002 | LD R1, 0, R2 | 0x1102 | load key into the register R2. |
| 0x0004 | SET 0xA0, R3 | 0x4A03 | set address of 0xA0 into the register R3. |
| 0x0006 | ENCRYPT R3, R2, R4 | 0x3324 | Encrypt the block pointed to be the register R3. |
| END CODE | | | |
| ... | | | |
| 0x0080 | | 0x3231 | Key |

In a second iteration, the code and the key may be mixed in accordance with a preferred embodiment of the present invention as illustrated in the following TABLE 4:

TABLE 4

| Address | Code | Binary Representation | Comment |
|---|---|---|---|
| 0x0000 | SET 0x02, R1 | 0x4021 | set address 0x02 into R1. |
| 0x0002 | ???? [XOR, R3, R2, R1] | 0x2321 | Key appears as an XOR operation using registers R1, R2 and R3. |
| 0x0004 | LD R1, 0, R2 | 0x1102 | load key into register R2. |
| 0x0006 | SET 0xA0, R3 | 0x4A03 | set address of 0xA0 into register R3. |
| 0x0008 | ENCRYPT R3, R2, R4 | 0x3324 | Encrypt the block pointed to by the register R3. |
| END CODE | | | |

When the mixing is completed, the code is tested for proper operation. In one example, the modified code may fail to operate properly. For example, the above code would not operate properly because the portion of the key inserted into the code alters the contents of the register R1. When the code and key mixture does not operate properly, further iterations of the code generating process may be performed to modify the code to correctly implement the cryptographic operation. For example, in a third iteration, the combined code and key may be modified toward achieving proper operation as illustrated in the following TABLE 5:

TABLE 5

| Address | Code | Binary Representation | Comment |
|---|---|---|---|
| 0x0000 | SET 0x02, R1 | 0x4021 | set address 0x02 into R1. |
| 0x0002 | ???? [XOR R3, R2, R1] | 0x2321 | Key appears as an XOR operation on registers. Register R1 is changed. |
| 0x0004 | SET 0x02, R1 | 0x4021 | set address 0x02 into register R1. |
| 0x0006 | LD R1, 0, R2 | 0x1102 | load key into register R2. |
| 0x0008 | SET 0xA0, R3 | 0x4A03 | set address of 0xA0 into register R3. |
| 0x000A | ENCRYPT R3, R2, R4 | 0x3324 | Encrypt the block pointed to by register R3. |
| END CODE | | | |

The code and key mixture may again be tested for proper operation. For example, after the above iteration, a check of the code would show that the cryptographic operation is performed correctly and the mixing process may be considered completed. However, had the code not performed correctly further iterations would be performed until the code operates correctly and the entire key (or data) is mixed in. In general, a plurality of keys or key fragments (or portions) may be mixed into the code using a plurality of iterations.

Referring to FIG. 4, a flow diagram is shown illustrating a process 200 in accordance with a preferred embodiment of the present invention. In one example, the process 200 may comprise a step (or state) 202, a step (or state) 204, a step (or state) 206, a step (or state) 208 and a step (or state) 210. The state 202 may comprise a code generation step. The state 204 may comprise a compilation step. The state 206 may comprise a mixing step. The state 208 may comprise a code modification step. The state 210 may comprise a final compilation step.

In the state 202, software (SW) code may be written for instructing a preselected processor to perform a cryptographic operation based on one or more predefined keys. In one example, the cryptographic operation may be described using an algorithm. When the code has been written, the process 200 may move to the state 204. In the state 204, the SW code and the one or more predefined keys may be combined. For example, the SW code may be compiled to generate binary data representation of the code. When the code has been compiled, the one or more predefined keys (or a portion of the one or more keys) may be spread (or mixed, or blended) into the binary data representation of the code in such a way that keys are valid SW opcodes for the preselected processor. In general, the process of mixing is not trivial. For example, an iterative process may be implemented where instructions are changed (e.g., to fake or useless instructions) and/or the manner in which keys are stored is changed. In general, the more difficult the process for mixing the code and keys is made, the more difficult recovering the keys is for hackers.

When the code and keys have been mixed, the process 200 may move to the state 206. In the state 206, the SW code may be modified to use the combined data to implement the cryptographic operation. When the modification of the SW code is completed, the process 200 may move to the state 208. In the state 208, the SW code is again compiled to generate a binary data representation and checked to determined whether the cryptographic operation is properly implemented. If the cryptographic operation is properly implemented, the process 200 may move to the state 210. Otherwise, the process 200 may return to the state 206. In the state 210, final compilation of the code may be performed. In one embodiment, the process 200 may be implemented as a set of iterative steps.

Figure 5:
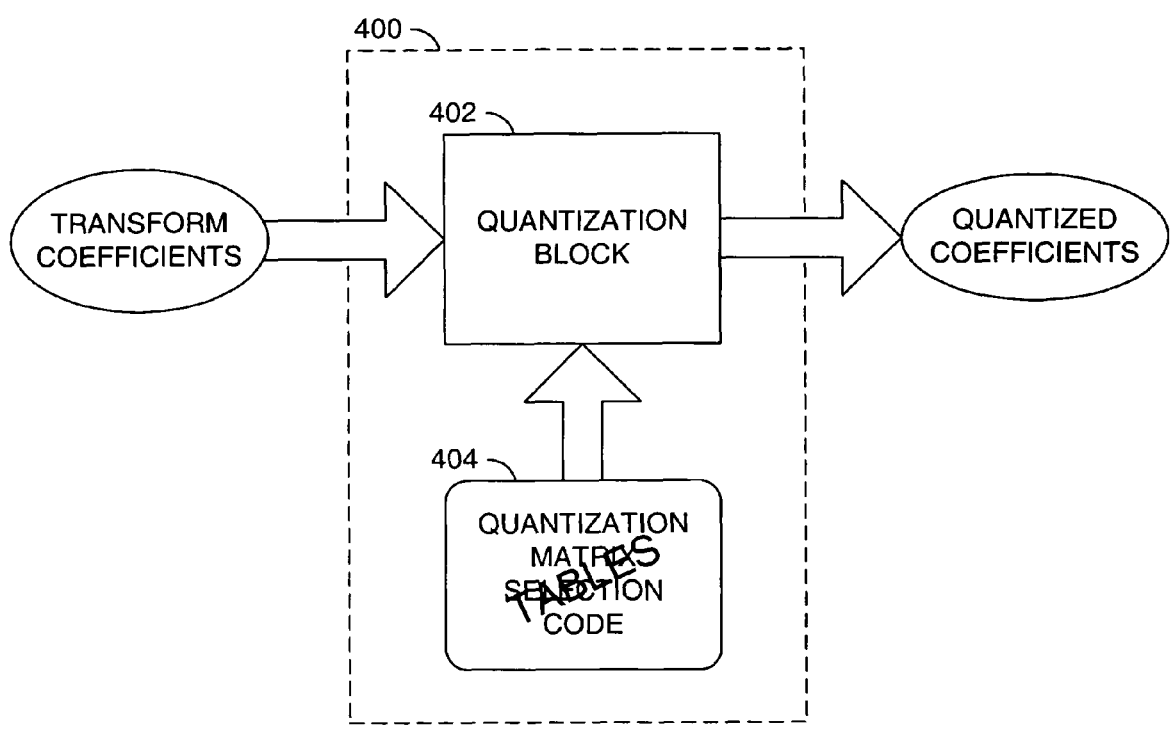
FIG. 5 is a block diagram illustrating a quantization scheme in accordance with the present invention.

Referring to FIG. 5, a block diagram is shown illustrating the quantization scheme in accordance with the present invention. A device 400 may be configured to convert transform coefficients into quantized coefficients. In one example, the device 400 may be implemented as an encoder circuit. The device 400 may include a quantization block 402 and a storage medium 404. The quantization block 402 may be configured to execute software (or firmware) instructions (or code) stored in the storage medium 404. In one example, the software instructions may be implemented (or configured, or designed) to cause the quantization block 402 to execute a predefined operation (e.g., a quantization matrix selection routine).

The code stored in the storage medium 404 may comprise instructions for performing a quantization matrix selection process involving one or more tables. In one example, the tables may contain proprietary (or private) information (or data). The tables may be mixed (or obscured) with the instructions for performing the quantization matrix selection. Because the code and the tables are mixed, as described herein, changes in the code (e.g., inserting breakpoints) would change the tables. Since changing the code changes the tables, the present invention would prevent insertion of breakpoints (which modify the code) to determine data in the tables and/or the quantization matrix selection technique.

Figure 6:
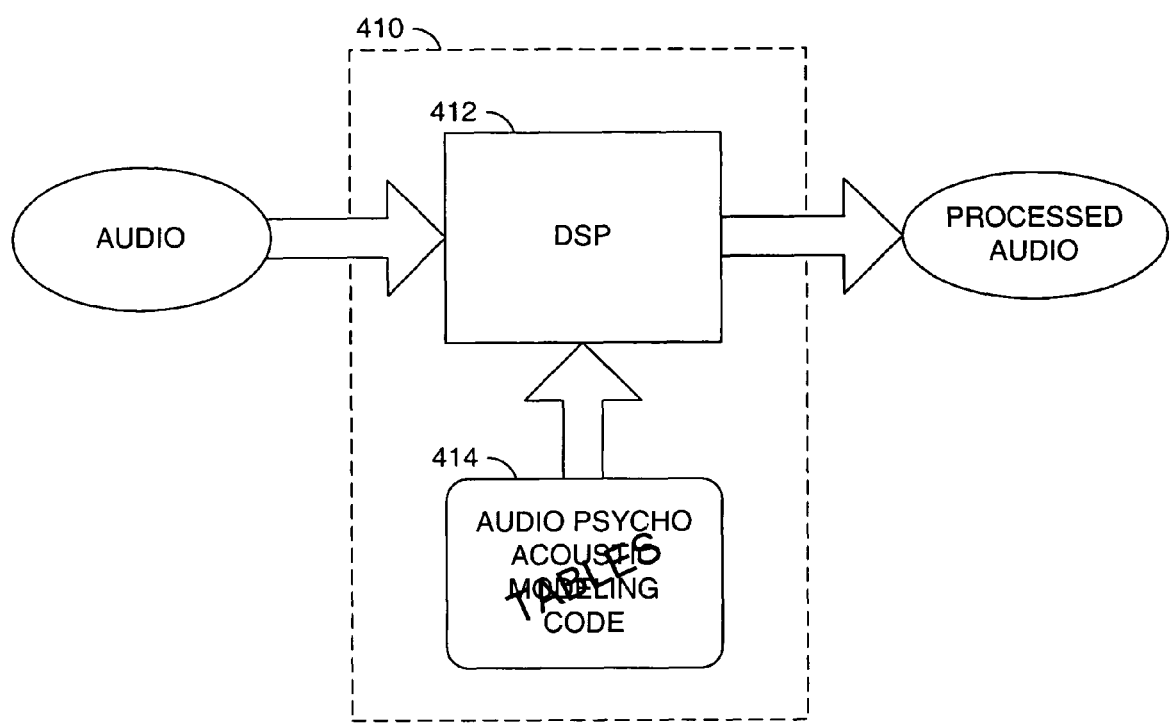
FIG. 6 is a block diagram illustrating a signal processing scheme in accordance with the present invention.

Referring to FIG. 6, a block diagram is shown illustrating an example application of the present invention in an audio processing environment. A device 410 may be configured to present processed audio by, in one example, performing a predefined operation (e.g., applying an audio psycho acoustic model) on an audio signal. The device 410 may include a digital signal processor (DSP) 412 and a storage medium 414. The DSP 412 may be configured to execute software (or firmware) instructions (or code) stored in the storage medium 414. In one example, the software instructions may be implemented (or configured, or designed) to cause the processor 412 to execute a predefined audio processing operation (e.g., an audio psycho acoustic modeling routine).

The code stored in the storage medium 414 may comprise instructions for performing the predefined audio processing operation involving one or more tables. In one example, the tables may be mixed (or obscured) with the instructions for performing the audio processing operation. Because the code is mixed with the tables, as described herein, changes in the code (e.g., inserting breakpoints) would also change the data in the tables. Since changing the code would change the data in the tables, the present invention generally prevents the use of breakpoints (which modify the code) for determining the proprietary data contained in the tables or the audio processing routine.

The present invention generally provides a process for combining (e.g., obscuring, mixing, spreading, blending, etc.) code for implementing a predefined operation (e.g., a cryptographic operation for copy protection, an operation for selecting quantization matrices for video encoding, an operation for modeling audio psycho acoustics for digital signal processing, etc.) and one or more sets of predefined data (e.g., keys, tables, etc.) used in the predefined operation. The present invention is generally applicable to any encryption/decryption process involving keys. As used herein, the term keys may also refer to any data which is to be kept secure or private and which may be used by the code with which the data is mixed.

In general, when mixed in accordance with the present invention, the code and the key(s) (or other data) are substantially indistinct from each other. For example, the code and key(s) are generally blended such that the code and the key(s) is not clearly or sharply delineated or distinguishable. In general, the code and the key(s) cannot be separated merely by inspecting the binary representation of the mixed code and key(s). The code generally obscures the key(s) (or other data) blended within the code. For example, modifying a device implementing the present invention to allow external access to (or reading of) the binary representation of the mixed code and key(s), although within the capabilities of those skilled in the relevant art(s), would not, by itself, compromise (or make available) the keys and/or the cryptographic (or other) process performed by the code. Altering the combined code and keys (e.g., by adding breakpoints, etc.) cannot be used to determine the keys and/or cryptographic (or other) process. If the instruction code is changed, the keys are changed because the keys and the instruction codes are one and the same after the mixing process in accordance with a preferred embodiment of the present invention.

The function performed by the flow diagram of FIG. 8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for obscuring data and software comprising the steps of:
   (A) generating a first code for performing a predefined operation on a data block, said predefined operation using one or more sets of predefined data;
   (B) generating a first binary representation of said first code that performs said predefined operation on said data block using said one or more sets of predefined data when executed by a processor;
   (C) mixing said one or more predefined sets of data into said first binary representation of said first code, wherein the mixture of said one or more predefined sets of data and said first code form a second binary representation of a second code;
   (D) modifying said second code until the modified second code performs said predefined operation on said data block; and
   (E) generating a third binary representation of the modified second code and storing the third binary representation of the modified second code in a computer readable medium, wherein when executed by said processor said third binary representation performs said predefined operation on said data block.

2. The method according to claim 1, wherein:
   the step of modifying the second code comprises two or more iterations.

3. The method according to claim 2, wherein a predefined portion of said one or more sets of predefined data is mixed with the code during each iteration.

4. The method according to claim 1, wherein said predefined operation comprises an operation selected from the group consisting of (i) a cryptographic operation, (ii) a digital signal processing (DSP) operation and (iii) a quantization matrix selection operation.

5. The method according to claim 1, wherein said one or more sets of predefined data comprise a cryptographic key.

6. The method according to claim 1, wherein said one or more sets of predefined data comprise a data table.

7. A computer readable storage medium comprising computer executable instructions for performing the steps of:
   generating a first code for performing a predefined operation on a data block, wherein said predefined operation uses one or more sets of predefined data;
   generating a first binary representation of said first code that performs said predefined operation on said data block using said one or more sets of predefined data when executed by a processor;
   mixing said one or more sets of predefined data into said first binary representation of said first code, wherein the mixture of said first code and said one or more sets of predefined data form a second binary representation of a second code;
   modifying said second code until the modified second code performs said predefined operation on said data block; and
   generating a third binary representation of the modified second code and storing the third binary representation of the modified second code in a computer readable medium, wherein when executed by said processor said third binary representation performs said predefined operation on said data block.

8. The computer readable storage medium according to claim 7, wherein the modification of the second code comprises two or more iterations.

9. The computer readable storage medium according to claim 8, wherein a portion of said one or more sets of predefined data is mixed with the modified code during each iteration.

10. The computer readable storage medium according to claim 7, wherein: said predefined operation comprises an operation selected from the group consisting of (i) a cryptographic operation, (ii) a digital signal processing (DSP) operation and (iii) a quantization matrix selection operation.

11. The computer readable storage medium according to claim 7, wherein said one or more sets of predefined data comprise a data type selected from the group consisting of a cryptographic key and a data table.

12. An apparatus comprising:
   a processor configured to generate a mixture of (i) code for performing a predefined operation involving one or more sets of predefined data and (ii) said one or more sets of predefined data such that said mixture operates as both said code and said one or more sets of predefined data, wherein said mixture is generated in response to a set of computer executable instructions; and
   a computer readable medium configured to store said set of computer executable instructions, wherein said set of computer executable instructions program said processor to perform the steps of (A) generating a first code for performing a predefined operation on a data block, wherein said predefined operation uses said one or more sets of predefined data, (B) generating a first binary representation of said first code that performs said predefined operation on said data block using said one or more sets of predefined data when executed by said processor, (C) mixing said one or more sets of predefined data into said first binary representation of said first code, wherein the mixture of said first code and said one or more sets of predefined data form a second binary representation of a second code, (D) modifying said second code until the modified second code performs said predefined operation on said data block, and (E) generating a third binary representation of the modified second code and storing the third binary representation of the modified second code in said computer readable medium, wherein when executed by said processor said third binary representation performs said predefined operation on said data block.

13. The apparatus according to claim 12, wherein said predefined operation is selected from the group consisting of (i) descrambling an input signal to generate an output signal, (ii) selecting one or more quantization matrices and (iii) processing a digital signal.

14. The apparatus according to claim 12, wherein said one or more sets of predefined data are mixed with said set of computer executable instructions using two or more iterations.

15. The apparatus according to claim 14, wherein a portion of said one or more sets of predefined data is mixed with said set of computer executable instructions during each iteration.

16. The apparatus according to claim 12, wherein said one or more sets of predefined data comprise a cryptographic key.

17. The apparatus according to claim 13, further comprising an optical drive mechanism configured to generate said input signal by reading an optical disk.

18. The apparatus according to claim 13, further comprising a receiver circuit configured to receive said input signal from a digital transmission medium.

19. The apparatus according to claim 12, wherein said processor comprises a device selected from the group consisting of a general purpose microprocessor, a digital signal processor (DSP) and a programmable device.

20. The apparatus according to claim 12, wherein said one or more sets of predefined data comprise a data table.

* * * * *